Figure 1:
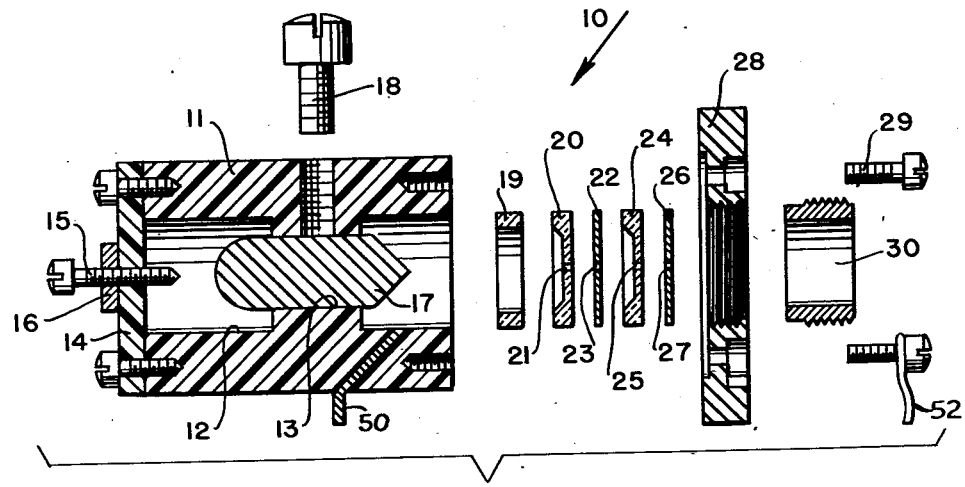

May 21, 1957     F. N. MILLER     2,793,323

HIGH SPEED LIGHT SOURCE

Filed Aug. 13, 1954

INVENTOR.
FRANK N. MILLER

BY G. D. O'Brien

ATTORNEY

United States Patent Office 2,793,323
Patented May 21, 1957

2,793,323

HIGH SPEED LIGHT SOURCE

Frank N. Miller, Inyokern, Calif.

Application August 13, 1954, Serial No. 449,808

13 Claims. (Cl. 315—168)

(Granted under Title 35, U. S. Code (1952), sec. 266)

The invention described herein may be manufactured and used by or for the Government of the United States of America for governmental purposes without the payment of any royalties thereon or therefor.

The present invention relates to a light source for use in the field of photography and has more particular reference to a high intensity, short duration collimated light source for supplying the illumination necessary to successful shadowgraphic recording of high speed phenomena.

In the making of shadowgraphs, an optical system is generally not employed, but rather the object whose silhouette is to be photographically reproduced is disposed between the light source and the film plane. If the diameter of the light source is made relatively small as compared with the dimensions of the subject and is positioned relatively near to the film plane, the resulting negative is equal in resolution to that obtainable with a high quality optical system. Where the subject is stationary or the phenomena to be recorded occurs at a relatively slow rate, the problem of producing a successful shadowgraph resolves itself into one of merely providing such an exposure time as to enable sufficient light from the relatively small light source to impinge on the film. Where a shadowgraph of a rapidly moving object or high speed phenomena is to be produced, however, the problem becomes one of combining adequate exposure with the exposure time necessary to effectively arrest image movement on the recording film. That is, the limit of permissible image movement during exposure may be set as the width of the diffraction fringes of visible light around the edges of the subject. Thus, the duration of the light source must be such as to produce an exposure time such that the loss of definition resulting from image movement is equal to or less than that due to diffraction. It will be apparent from the foregoing that the intrinsic brilliance of the light source must be relatively great to produce successful shadowgraphs of high speed phenomena owing to the required small diameter of the source.

Various attempts have been made to produce a light source which has the necessary brilliance and reduced diameter required, for example, in producing shadowgraphs of projectiles in flight. One of the light sources previously devised for shadowgraphic purposes was a coaxial spark gap arrangement wherein the spark produced upon discharge of a capacitor was confined in a relatively small space in such a manner as to effect a buildup of temperature and pressure to values which would cause vaporization of the spark gap elements with the resultant creation of a light source of high intrinsic brilliance. Such prior arrangement, while producing the luminosity necessary to shadowgraphy, was not completely satisfactory, however, owing to the fact that the pressures involved were of such magnitude as to cause the greater portion of the expansion of the ionized media to occur outside of the gap proper with the resultant creation of a light source having an effective diameter in excess of that required to produce fine resolution in projectile shadowgraphy, for example. Moreover, the luminosity of the source existed, in some cases near its maximum value, long after the energy of the condenser had been dissipated. Thus, the duration of the source was far greater than is allowable in shadowgraphic recording of high speed phenomena and assigned a theoretical limit to the maximum rate of which phenomena to be recorded could occur consistent with fine resolution.

The present invention provides a coaxial spark gap or collimated light source which avoids the disadvantages inherent in the prior coaxial spark gap arrangements by employing a series of apertured baffles, in the pressure escape path for the gap, which baffles are so shaped and spaced as to provide therebetween a plurality of spaces in which expansion of the spark gap gases may occur whereby the main blast of the gap will emerge from the aperture in the last baffle as a shaped jet of high photo-intensity and small effective diameter. A suitable electrical damping circuit is also provided whereby only the energy available in the first half of the primary sine wave characteristic of the discharge charge cycle of the spark gap condenser is utilized with a resultant reduction in the duration of the source.

In accordance with the foregoing, an object of the present invention is the provision of an improved collimated light source.

Another object of the invention is the provision of a relatively short duration collimated light source.

And another object of the invention is the provision of an improved coaxial spark gap light source of relatively short duration, high photointensity, and small effective diameter.

A further object of the invention is the provision of an improved coaxial spark gap light source as in the foregoing wherein there are provided a series of apertured baffles in the pressure escape path of the gap which baffles are so shaped and positioned as to provide therebetween spaces to allow for expansion of the spark gap gases whereby the main blast of the gap will emerge from the aperture in the last baffle as a shaped jet of high photo-intensity and small effective diameter.

Still a further object of the invention is the provision of an improved coaxial spark gap as in the foregoing for providing a light source having the relatively high photo-intensity, short duration, and small effective diameter necessary to sucessful shadowgraphic recording of high speed phenomena.

Figure 2:
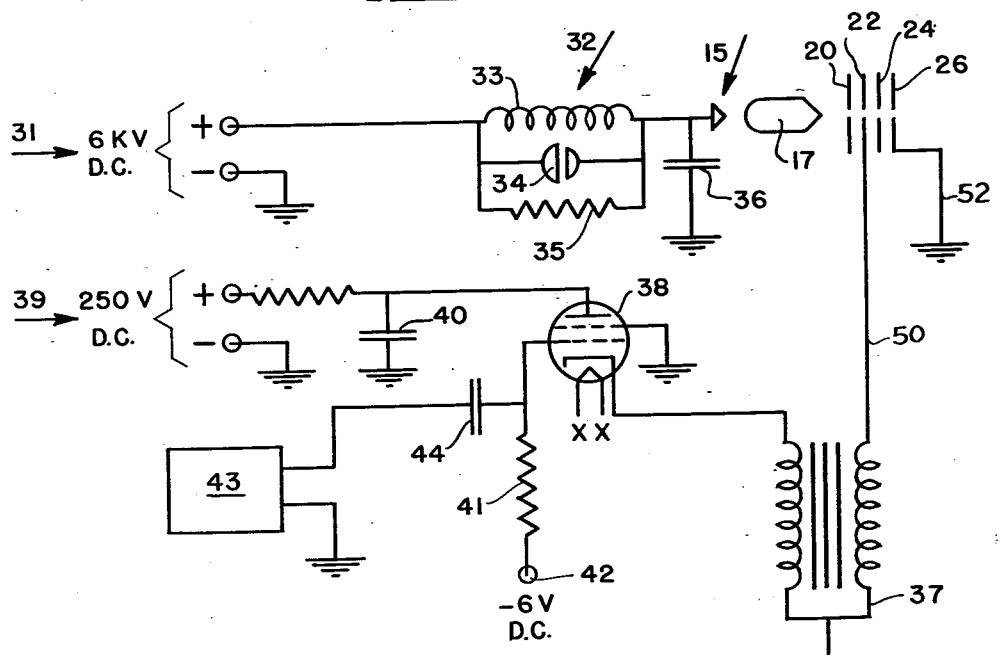

Other objects and many of the attendant advantages of this invention will be readily appreciated as the same becomes better understood by reference to the following detailed description when considered in connection with the accompanying drawings wherein:

Fig. 1 is an exploded view, in longitudinal cross-section, of the coaxial spark gap light source of the present invention; and Fig. 2 is a schematic presentation of the electrical circuit employed for effecting operation of the present light source.

Referring now to the drawings and more particularly to Fig. 1 thereof, the collimated or coaxial spark gap light source 10 of the invention comprises a housing 11 constructed of a suitable electrical insulating material, such as formica, and having a conductor 50 imbedded in the wall thereof in the position shown in Fig. 1 for making electrical connection between an internal part and a source of electric potential, all to be later described. Housing 11 has formed therethrough a bore 12 which has an intermediate portion 13 of reduced diameter. Fixed to one end of housing 11, as by means of screws as shown, is a plate 14 of electrical insulating material which threadedly carries a pointed screw 15 forming one element or electrode of the spark gap. A lock nut 16 may be provided for securing the screw 15 in place after the axial position of the latter has been adjusted by the rotation thereof in plate 14. Slidably disposed in reduced portion 13 of bore 12 is a second, or floating electrode 17 which, after it has been properly positioned, is secured in place by means of a set screw 18. The baffle arrangement of the present invention, which provides a series of spaces for expansion of the spark gap gases prior to emergence of the small light-producing jet from the last baffle, as will be seen, is shown in exploded relation to housing 11 in Fig. 1, the baffles, in the assembled position of the parts, being disposed within the right hand end portion of bore 12, as seen in Fig. 1. The baffle arrangement comprises an annular ceramic spacer element 19 which is adapted to be seated against the shoulder formed by reduced portion 13 in bore 12. Adapted to be disposed in abutting relation to spacer 19 is a first ceramic baffle 20 which has its inner face recessed, as shown, the interior of spacer 19 and the recess in baffle 20 forming a first space for expansion of the spark gap gases. Baffle 20 has a small aperture 21 extending therethrough at its center. In abutting relation to baffle 20 is adapted to be disposed a metallic disc 22 formed at its center with an aperture 23 which is aligned with the aperture 21 in baffle 20 and has a diameter slightly larger than aperture 21 whereby disc 22 will be protected from the main pressure blast issuing from aperture 21. Disc 22 is made slightly concave to the right and functions as pressure baffle as well as a trigger element as will be seen. The concavity of disc 22 is so slight and the degree of greater diameter of aperture 23 over that of aperture 21 is so small that these features have not been illustrated. A third baffle 24, of ceramic material, is adapted to be disposed in contact with disc or baffle 22 and has formed at its center an aperture 25 of the same diameter as the aperture 21 in baffle 20. Baffle 24 has a recess formed in its side adjacent to disc 22, as shown, which recess provides a second space for the expansion of the spark gap gases. A fourth and last metallic disc or baffle 26, which forms the second spark gap electrode, is adapted to be positioned in contact with the third baffle 24 and is formed with a slightly enlarged aperture 27 at its center in alignment with aperture 25 in baffle 24. The conductor 50 is so positioned and the size of the baffles 19, 20, 22, 24 and 26 are such, relative to the housing size, that conductor 50 makes electrical contact with the disc 22 for connection to transformer 37 as described hereinafter, when the parts are assembled in the housing. A plate 28 is adapted to be secured to the end of housing 11 as by screws 29 and has a threaded opening therein for receiving a threaded collar 30, which collar, in the assembled position of the parts engages the fourth baffle 26 and serves to retain the spacer 19 and baffles 20, 22, 24, and 26 in position in bore 12. It should be noted that plate 28, collar 30, screws 29 and disc 26 are all metallic conductive pieces and are in contact when the pieces are assembled within the housing as described. A conductor 52 is attached to any one of these metallic pieces and to ground in order to place the disc or baffle 26 at ground potential, the illustrated example showing the conductor 52 attached to one of the screws 29.

Referring now to Fig. 2, the electrical circuit for energizing the present coaxial spark gap comprises a high voltage section including a D. C. voltage source 31, the negative terminal of which is grounded and the positive terminal of which is connected through an electrical oscillation damping circuit 32, consisting of an R.-F. choke 33, neon light element 34, and resistor 35 all arranged in parallel, to one terminal of a main spark gap discharge condenser 36, the other terminal of which condenser is grounded. As shown, electrode 15 of the spark gap is connected to the high voltage side of condenser 36 while floating electrode 17 is electrically isolated and functions in a manner hereinafter described. Baffles 20 and 24, being of a ceramic material, form no active part of the electrical circuit but are shown in Fig. 2 in the interest of clarity. The second baffle, or metallic disc 22 is electrically connected to the secondary winding of a transformer 37, as by the conductor 50 and is grounded through said winding, as shown, while the fourth baffle, or metallic disc 26 is at ground potential by virtue of the grounding of conductor 52 which has electrical connection with the disc 26. The energizing circuit for the spark gap in addition to the high voltage section above described includes a low voltage triggering section comprising a thermionic tube 38 the cathode of which is grounded through the low resistance primary of transformer 37 and the plate of which is connected to the positive terminal of a negative grounded D. C. voltage supply 39 through a resistor as shown. A secondary discharge condenser 40 has one terminal connected to the high voltage terminal of D. C. supply 39 and to the plate of tube 38 and the other terminal grounded. The control grid of tube 38 is brought to ground through a grid resistor 41 and a positive grounded 6 v. D. C. voltage source 42 which normally acts to bias tube 38 beyond cut-off. Arranged in shunt with grid resistor 41 and bias voltage source 42 is a pulse circuit including any conventional device 43 for producing a positive pulse of sufficient magnitude to effectively remove the negative bias on the grid of tube 38 or make the grid positive with respect to ground. Pulsing device 43 is connected to the grid of tube 38 through a blocking condenser 44.

Operation of the invention is as follows. The main spark gap of the present collimated light source is defined by the space between terminal 15 and grounded metallic disc 26. Partial distortion of the dielectric of this gap is brought about by disposing therein the floating electrode 17 whereby the main spark gap may be defined as comprising a first gap, the space between terminal 15 and floating electrode 17, and a second gap, the space between floating electrode 17 and disc or electrode 26. Upon the main discharge condenser 36 being charged, the electrode 17 ceases to be electrically floating in the exact sense owing to a small amount of ionization, produced by the pointed electrode 15, confined in the first gap. This corona produced in the first gap is, however, not sufficient to cause complete breakdown of the main discharge gap, and hence dissipation of the potential energy of condenser 36, owing to the resistance presented by the air dielectric of the second gap. Thus, if the dielectric field of the second gap is sufficiently ionized, complete breakdown of the main spark gap, and therefore dissipation of the potential energy of condenser 36, may be caused. To this end the above described low voltage section of the energizing circuit is provided which section functions as a triggering circuit as will now be described. When, after main discharge condenser 36 has been charged from the high voltage supply 31, it is desired to initiate formation of an arc across the main discharge gap, as, for example, when a projectile, whose shadowgraph in flight is to be taken, attains such a position in flight that the additional movement of the projectile during a period of time equal to that required for the spark gap arc to reach maximum photointensity or, in other words, for the peak of the energy dissipation to occur, will place the projectile directly between the light source and recording medium, pulsing device 43 is actuated in some suitable manner, as by the projectile passing through a paper-backed printed circuit grid, to produce a positive pulse. The application of the positive pulse to the grid of tube 38 results in the removal of the negative grid bias whereby the tube becomes conductive, permitting condenser 40 to discharge through the primary winding of transformer 37. The resultant high potential E. M. F. induced in the secondary of transformer 37 is discharged from the edge of the aperture 23 in disc 22 to the edge of the aperture 27 in grounded disc 26. This discharge produces sufficient ionization of the air dielectric in the second gap to insure breakdown of the latter and hence dissipation of the steady state potential of the main discharge condenser 36 across the main spark gap. The main discharge initially produces illumination characteristic of a gas arc. However, as temperature and pressure rise, vaporization of the electrodes commences and the gas arc undergoes a transition to a vapor arc, the peak of light energy being produced during the life of the gas arc. The vapor arc life accounts for the greater portion of the total light duration which has been found to be approximately $11 \times 10^{-8}$ seconds. Expansion of the gases produced by the arc occurs in the aforedescribed recesses between baffles and the main blast of the arc emerges from aperture 27 in the last disc or baffle 26 as a jet of high photointensity and small diameter whereby to provide a point light source as required in shadowgraphic recording. When the dissipation of the steady state potential of a capacitor is used for a source of illumination, as in the present invention, it is desirable to utilize the energy available in the first half of the primary sine wave characteristic of the discharge charge cycle. To this end, the damping circuit 12 is provided which completely eliminates all oscillation and provides for a light source of a very short duration whereby to be especially suitable for producing shadowgraphic recording of high speed phenomena.

Obviously, many modifications and variations of the present invention are possible in the light of the above teachings. It is therefore to be understood that within the scope of the appended claims the invention may be practiced otherwise than as specifically described.

What is claimed is:

1. A coaxial spark gap light source comprising a hollow housing, first and second electrodes disposed within said housing, said second electrode comprising a metallic element having an aperture communicating the interior of said housing to atmosphere, a plurality of apertured baffle elements disposed between said electrodes with their apertures aligned with the aperture in said second electrode, at least some of said baffle elements being of ceramic material and being recessed on the side nearest the first electrode to provide spaces for expansion of the ionized media produced by the formation of an arc discharge between said electrodes whereby to effect the issuance of a jet of relatively high photointensity and small diameter from the aperture in said second electrode.

2. A light source according to claim 1 wherein one of said apertured baffle elements comprises a metallic element, said last mentioned element and said second electrode defining therebetween a secondary gap across which a voltage is adapted to be impressed for initiating the formation of an arc discharge between said first and second electrodes.

3. A light source according to claim 2 and an adjustable metallic member disposed between and electrically isolated from said electrodes and forming an electrically floating electrode for distorting the dielectric field between said electrodes.

4. A high intensity, short duration, point light source for shadowgraphic recording of high speed phenomena comprising a housing having an elongated chamber open at one end, a pair of longitudinally spaced spark gap terminals within said chamber, the one of said terminals nearest said open end, closing said open end and having an aperture therethrough communicating the chamber to atmosphere, a plurality of apertured baffle elements extending across the chamber and interposed between said terminals with their apertures aligned with the aperture in said one terminal, at least some of said baffle elements being recessed on the side nearest the other of said terminals, means for producing a potential difference between said terminals for effecting an arc discharge between the latter, said apertures forming a pressure escape path to atmosphere for the ionized media produced by said arc discharge, said recesses forming spaces in which expansion of said media may occur whereby to effect the issuance of a jet of relatively high photointensity and small diameter from the aperture in said one terminal.

5. A light source according to claim 4 wherein said means produces a potential difference just slightly less than that required to ionize the air dielectric between said terminals to the extent necessary to cause formation of said arc discharge, and wherein further one of said baffle elements spaced from said one terminal comprises a metallic element, and means for producing a potential difference between said last mentioned element and said one terminal whereby to produce sufficient ionization of the air dielectric therebetween to initiate the formation of said arc discharge between said terminals.

6. A light source according to claim 5 wherein said first mentioned means comprises a condenser connected across said terminals and an electrical circuit for charging said condenser to provide said potential difference.

7. A light source according to claim 6 and electrical oscillation damping means in circuit with said condenser whereby only the energy available in the first half of the primary sine wave characteristic the condenser discharge cycle is utilized in the formation of said arc discharge.

8. A light source according to claim 7 wherein said second mentioned means comprises a condenser, means for charging said last mentioned condenser, and selectively operable means for effecting discharge of the potential energy of said last mentioned condenser across the gap between said metallic baffle element and said one terminal.

9. In a coaxial spark gap light source of the type including a housing formed with an elongated chamber open at one end for confining expansion of the ionized media resulting from the formation of an arc discharge between a pair of longitudinally spaced electrodes within the chamber; the improements wherein the one of said electrodes nearest the open end of said chamber comprises a metallic element closing said open end and having formed therethrough a relatively small aperture communicating said chamber to atmosphere, a plurality of apertured baffle elements extending across the chamber between said electrodes with their apertures aligned with the aperture in said one electrode, at least some of said baffle elements being of ceramic material and recessed on the side nearest the other of said electrodes, said apertures providing an escape path to atmosphere for the pressurized ionized media produced by said discharge, said recesses providing spaces for expansion of said media whereby to provide for the issuance of a jet of relatively high photointensity and small diameter from the aperture in said one electrode.

10. The improvements as recited in claim 9 wherein one of said baffle elements is metallic and forms with said one electrode a secondary gap across which an electrical discharge is adapted to be produced for initiating the formation of said arc discharge between said electrodes.

11. The improvements as recited in claim 10 and an electrically floating electrode adjustably disposed between said electrodes for permitting desired distortion of the air dielectric therebetween.

12. A light source according to claim 4 having also interposed between said terminals a floating electrode element whereby a damping of the oscillations of discharge between the terminals may be effected.

13. A light source according to claim 12, having also included in the circuit an R.-F. choke coil to further effect a dampening effect upon discharge between the terminals.

References Cited in the file of this patent

UNITED STATES PATENTS

| | | |
|---|---|---|
| 1,991,480 | Williams | Feb. 19, 1935 |
| 2,606,308 | Parker | Aug. 5, 1952 |
| 2,673,308 | Herring, Jr. | Mar. 25, 1954 |